Figure 1:
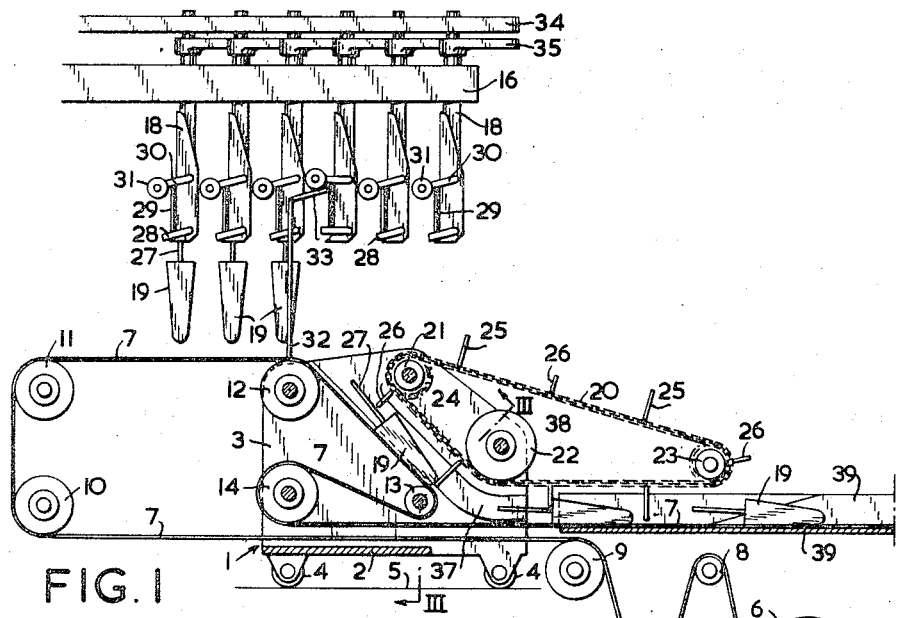

Sept. 12, 1967  O. G. HOYER  3,340,674
APPARATUS FOR WRAPPING ICE CREAM BRICKS AND
SIMILAR MOULDED BODIES
Filed June 15, 1964  3 Sheets-Sheet 1

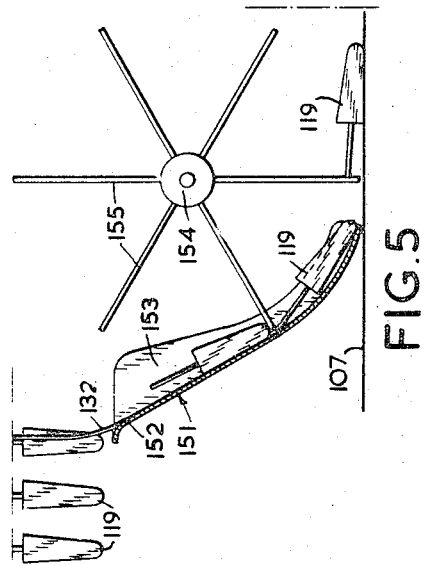
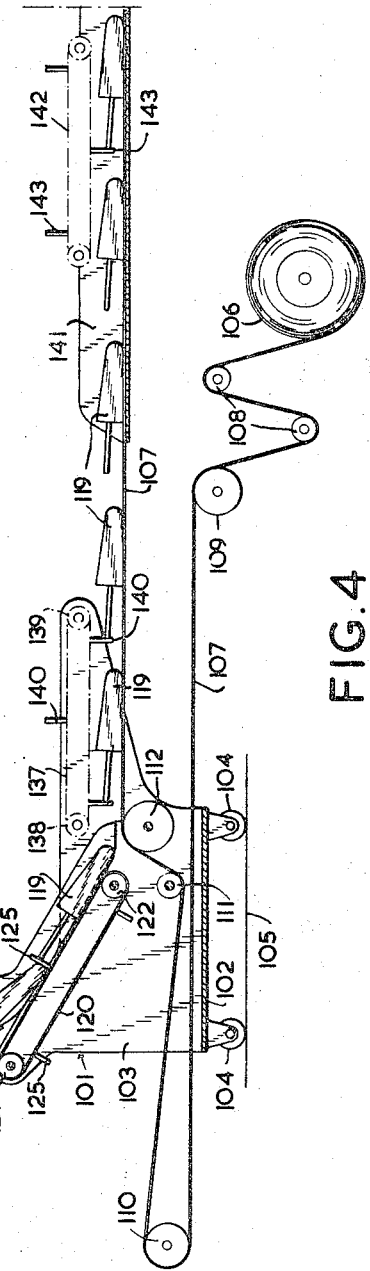
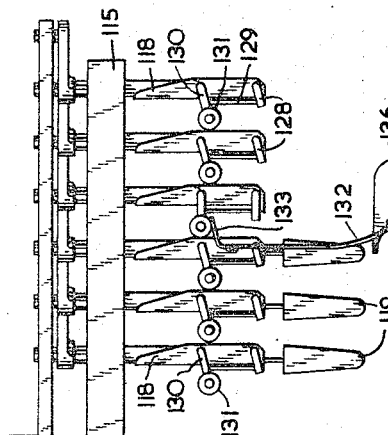
FIG. 5
FIG. 4

United States Patent Office 3,340,674
Patented Sept. 12, 1967

3,340,674
APPARATUS FOR WRAPPING ICE CREAM BRICKS
AND SIMILAR MOULDED BODIES
Oluf Gudmund Høyer, 8 Finlandsgade,
Aarhus, Denmark
Filed June 15, 1964, Ser. No. 375,199
Claims priority, application Denmark, June 17, 1963,
2,860/63
11 Claims. (Cl. 53—209)

This invention relates to a method of wrapping ice cream bricks and similar moulded bodies, which in a suspended position are conveyed in rows to a wrapping station, in which station they are wrapped one by one in wrappers made from a web of wrapping material.

In the mechanical wrapping of ice cream bricks produced in, for example, rotary ice cream freezing machines comprising radial rows of freezing cells and including a picking-up apparatus having a rotary hub provided with a plurality of spokes and holding means on said spokes for picking up ice cream bricks row-wise from the freezing cells and transferring the ice cream bricks to a wrapping machine, the following procedure has heretofore been employed. The row of ice cream bricks depending from a spoke on the picking-up apparatus is, by lowering said spoke and simultaneously releasing the holding means, transferred to an angular tray which is subsequently turned through 90° so as to cause the ice cream bricks to assume a horizontal position. Next, the ice cream bricks are transferred from the tray to a link conveyor which has transversal partitions dividing it into compartments each of which accommodates an ice cream brick. Then, the conveyor is advanced stepwise to a wrapping machine in which a web of wrapping material is fed continuously beneath the conveyor and at right angles thereto. The ice cream bricks are transferred one by one to the wrapping machine from the conveyor during a dwelling period thereof by means of a reciprocating device which is moved across and above the conveyor in the longitudinal direction of the web of material, said device comprising two movable jaws which grip the ice cream brick endwise and then accelerate it up to the constant speed of the web of wrapping material, whereafter the jaws release the ice cream brick which consequently is deposited on the web of material, and return to grip another ice cream brick on the link conveyor.

This method is encumbered with various disadvantages. In particular it is difficult to make the reciprocating gripping device that transfers the ice cream bricks from the link conveyor to the wrapping machine, work satisfactorily and reliably at the very rapid tempo which is required. In this connection it should be borne in mind that the duration of the cycle in a rotary ice cream brick machine of the type concerned is of the order of 3–4 seconds, and during this period all ice cream bricks in a row, which may contain up to fifteen ice cream bricks, are to be transferred one at a time from the link conveyor to the wrapping machine by the operations described. The conveyor disposed between the picking-up apparatus and the wrapping machine also represents a hygienic problem in that material from the surface of the ice cream bricks, especially if they are coated with chocolate, will become deposited on the surface of the conveyor during the transfer of the bricks to and from the conveyor. Consequently, it is necessary to clean the conveyor at frequent intervals which necessitates an interruption of the production.

It is an object of the invention to provide a method which overcomes or substantially diminishes the said disadvantages, and according to the invention the web of wrapping material is advanced continuously from a supply in a horizontal direction parallel to and beneath the row of suspended moulded bodies, and the moulded bodies are caused to move from their suspended position down onto successive portions of the web of wrapping material along pre-determined paths of travel, the bodies being guided by guide means which cause them to alter their vertical position and assume a horizontal position on the web of material.

Hereby it is attained that the wrapping material, thanks to the guided transfer of the moulded bodies from the vertical to the horizontal position, can be advanced continuously directly beneath the suspended row of moulded bodies, and thus the wrapping process can be performed as an entirely continuous process with the advantages accruing therefrom as compared with the previous intermittant processes. The wrapping machine may be disposed in direct connection with the picking-up apparatus which will afford a very compact installation.

According to a further feature of the invention, the moulded bodies are caused to fall from their suspended position successively directly down onto a forwardly and downwardly inclined section of the web of wrapping material which is moved over said guide means. Hereby it is inter alia attained that the hygienic problems are substantially reduced in that the moulded bodies are deposited directly on the wrapping material.

The invention also relates to an apparatus for performing the method disclosed above, said apparatus comprising a carriage which is arranged for performing a reciprocating movement beneath and substantially parallel to a holder having means for holding a row of moulded bodies, said carriage comprising means for advancing a web of wrapping material through the carriage with a forwardly and downwardly inclined section and a subsequent section which extends substantially horizontally in the direction of movement of the carriage towards a wrapping unit for wrapping the moulded bodies, and means for successively releasing the holding means in response to the movement of the carriage in one direction, said releasing means being disposed and shaped so that subsequent to the associated holding means having been released, a moulded body will fall down onto the downwardly inclined section of the web of wrapping material.

For the purpose of further ensuring accordance between the speed of the web of material and that of the moulded body accelerated by the fall, the carriage may according to a further feature of the invention be provided with locating means which are arranged for being moved along the web of material at a speed substantially the same as that of the web, and for determining in cooperation with said web the location of the moulded bodies in the longitudinal direction of the web.

According to a further feature of the invention the carriage may be arranged for performing its return movement at substantially the speed of advance of the web, and the locating means are then arranged for assuming a dwelling stage during the return of the carriage. It will be understood that this simplifies the control of the speed of the locating means which, as a matter of fact, due to the varying relative speed of the wrapping material with respect to the carriage must be different during the advance of the carriage, when the moulded bodies are removed from the holding means, and during the return movement, respectively.

A simplified apparatus for performing the method according to the invention comprises means for advancing a web of wrapping material so as to present a section extending substantially horizontally beneath and parallel to a holder having holding means for a row of moulded bodies, said web being advanced by said means from a supply in a direction towards a wrapping unit for wrapping the moulded bodies, and the apparatus further comprises at least one guide means which is inclined forwardly and downwardly towards the said section of the web for transferring the moulded bodies from the holder to the web, and locating means movable along at least part of the horizontal section of the web for determining the location of the moulded bodies in the longitudinal direction of the web.

For wrapping moulded bodies, the surface of which is of such nature that it has no substantial tendency for sticking to or coming off on the guide means, for example so-called frozen lemonade or sherbet confections, the said guide means may advantageously be substituted for the forwardly and downwardly inclined section of the web of material as used in the apparatus referred to above.

According to a further feature of the invention the guide means may consist of a mechanically driven conveyor belt. The conveyor belt is preferably driven substantially synchronously with the advance of the web of material through the apparatus, so that the proper location of the successive moulded bodies on the web of wrapping material is largely ensured by the guide means, and only minor corrections of the location of the moulded bodies will have to be carried out by the final locating means.

In wrapping moulded bodies having an appropriately smooth surface, a guide means consisting of a chute may be employed according to a further feature of the invention. When the guide means and the locating means are mounted on a carriage reciprocating beneath the row of suspended moulded bodies, the chute may be stationary in relation to the carriage. The chute is preferably curved with its concave side facing upwardly, and in conjunction with such a chute it is, according to a further feature of the invention, possible to use a structurally very simple locating means which consists of projecting vanes mounted on a rotary wheel, the axis of which extends exactly or substantially through the centre of curvature of the chute.

According to a further feature of the invention the apparatus may comprise a plurality of chutes for the simultaneous transfer of a plurality of moulded bodies from the holder to the web of wrapping material. In this embodiment it is possible to entirely dispense with the above-mentioned reciprocating carriage as the chutes may be stationary, and all moulded bodies contained in a row may, dependent on the prevailing circumstances, be transferred to the web of wrapping material in one step or in two or more steps. In the latter case this embodiment may also be used in conjunction with a reciprocating carriage, the travel of which will in such case be shorter than in the case of one-by-one transfer of the moulded bodies to the web of wrapping material.

Figure 2:
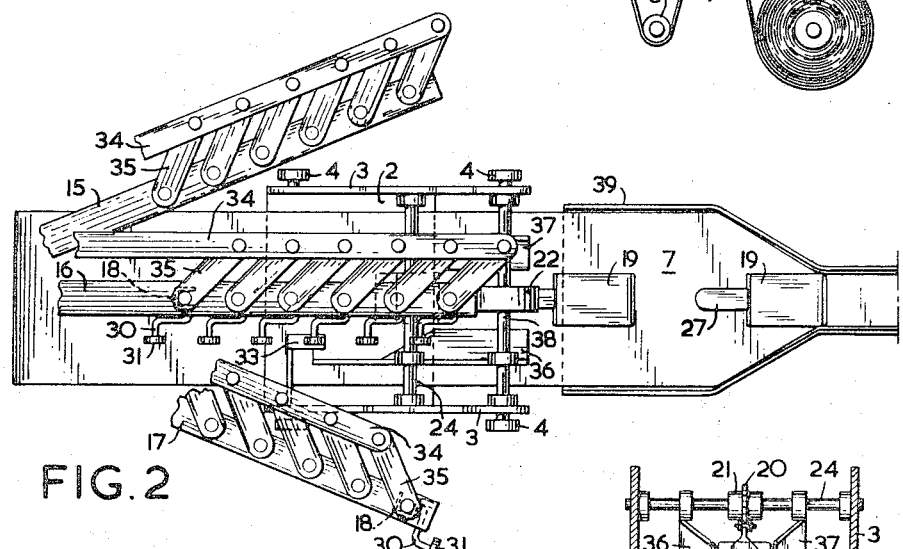
Figure 3:
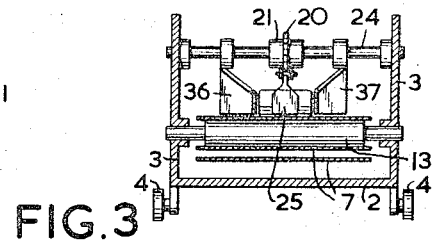
Figure 6:
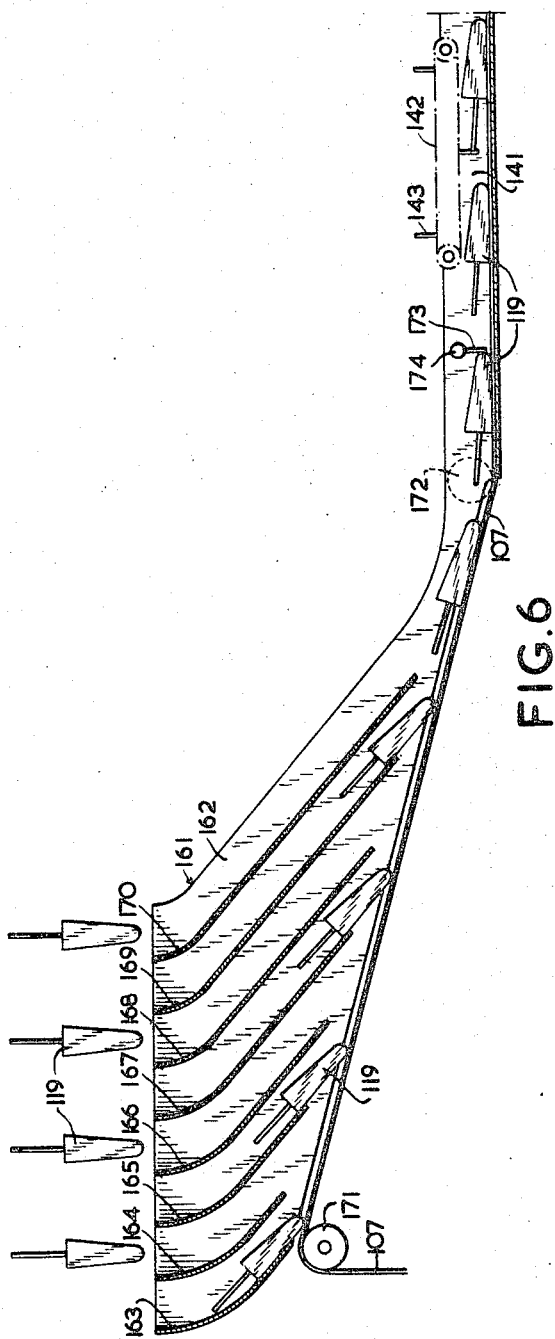

Further objects and features of the invention will be apparent from the following description in which reference is made to the accompanying diagrammatical drawings, where:

FIG. 1 is an elevation, partially in section, of a first embodiment of an apparatus according to the invention, FIG. 2 is a plan view of the apparatus shown in FIG. 1 with some parts removed for the sake of clarity, FIG. 3 is a section taken on line III—III in FIG. 1, FIG. 4 is an elevation, corresponding to FIG. 1, of a second embodiment of the apparatus according to the invention, FIG. 5 is an elevation of a detail in a modified embodiment of the apparatus, and FIG. 6 is an elevation of a further embodiment, in which some of the details already shown in FIG. 1 have been omitted for the sake of clarity.

The apparatus shown in FIGS. 1–3 comprises a carriage 1 which generally consists of a U-shaped frame with a horizontal bottom plate 2 and two upwardly projecting side members 3. By means of four wheels 4 the carriage is supported on two rails 5 on a base not shown.

The base contains bearing means for accommodating a roll 6 of wrapping material, and a web 7 of wrapping material is fed from the roll 6 over a diagrammatically shown tensioning unit comprising rollers 8, and further over a roller 9 journalled in the base, in a horizontal run through the carriage 1, over two rollers 10 and 11 journalled in the base, and back to the carriage 1 in a horizontal run above the first mentioned run. In the carriage 1 the web 7 then passes over a roller 12 in a forwardly and downwardly inclined direction, then rearwardly over a roller 13 to a roller 14, and from this roller 14 the web again extends forwardly and horizontally above the first horizontal run of the web through the carriage. From the carriage 1 the web of material continues to a wrapping machine, not shown, which may be of conventional design.

The apparatus shown is used in conjunction with an ice cream brick freezing machine, for example a rotary machine of the type described in my U.S. Patent No. 3,068,911. Associated with the freezing machine there is a picking-up apparatus comprising a plurality of spokes each of which is provided with a plurality of holding means or tongs corresponding to the number of freezing cells in a radial row in the freezing machine. The drawings shows three spokes of the picking-up apparatus designated by 15, 16 and 17, and each spoke is shown as having six tongs 18. In the position shown in the drawing the spoke 16 of the picking-up apparatus is located just above and parallel to the upper run of the web 7, and the carriage 1 of the apparatus is in the position where three ice cream bricks 19 originally held by the tongs 18 of the spoke 16 have already been released from the tongs. Thus, the carriage 1 is on its way inwardly towards the vertical axis of rotation of the picking-up apparatus, i.e. to the left in FIG. 1.

An endless chain 20 is passed over three sprockets 21, 22 and 23, of which the sprockets 21 and 22 are journalled in the side members 3 of the carriage 1 whilst the sprocket 23 may be journalled in arms, not shown, secured to the carriage 1. In the embodiment shown the sprocket 21 is freely rotatable on a shaft 24 secured in the two side members 3.

The sprockets 21, 22 and 23 are so disposed that between the sprockets 21 and 22 the chain moves parallel to the inclined section of the web 7 between the rollers 12 and 13, and between the sprockets 22 and 23 the chain extends parallel to the horizontal section of the web 7 of wrapping material between the carriage 1 and the wrapping machine not shown.

To the chain 20 there are secured locating means 25 and 26, respectively, alternately one of each type. The locating means 25 project so far from the chain that on the two runs of the chain which move parallel to the web 7 they almost reach said web whilst the locating means 26 are shorter so that a carrying stick 27 of an ice cream brick 19 deposited on the web 7 goes clear of the lower edge of the locating means.

Each tongs 18 are provided with a spring-loaded clip being capable of holding a carrying stick 27 in the tongs and being releasable against the urge of the spring in response to a pivoting of an arm 28 projecting from the tongs 18. Via a rod 29 the arm 28 is connected with another pivotal arm 30 carrying a roller 31. In FIG. 2 the arms 28 and 30 have been left out in connection with the spoke 15 of the picking-up apparatus, and only one of the arms 30 with the associated roller 31 is shown in connection with the arm 17.

To the carriage 1 there is secured an upwardly extending rod 32 which at its upper end is provided with an inclined plate 33 which is disposed so that when the carriage 1 moves from the right to the left in FIG. 1, the plate will successively get into contact with the rollers 31 on each of the tongs 18 and, consequently, turn the arms 30 and 28 and release the spring-loaded clip so that the ice cream brick 19 held in the tongs will drop towards the carriage 1.

As the freezing cells of the freezing machine, not shown, are so disposed that the long sides of the rectangular cross-sections of the ice cream bricks 19 extend radially with respect to the annular refrigerator mould, the ice cream bricks will, when they have been picked up from the freezing cells, be correspondingly disposed with their broad faces in a direction parallel to the spokes 15–17 of the picking-up apparatus. When the ice cream bricks 19 are transferred from the picking-up apparatus to the web 7 of wrapping material, they should be deposited on their broad faces and, consequently, means have been provided for turning the ice cream bricks through an angle of 90° prior to their being deposited on the web. These means consists of a rod 34 extending along each of the spokes of the picking-up apparatus, which rod is connected via linkages 35 with a plurality of vertical pins pivotally secured in each of the spokes 15–17 and secured to the tongs 18. During the stepwise rotation of the picking-up apparatus from the picking-up of the ice cream bricks to their being deposited in the apparatus shown, the rod 34 is actuated for example by a stationary cam, not shown, in the hub of the picking-up apparatus, whereby the tongs 18 are turned to the position shown in FIG. 1. Subsequent to the deposit of the ice cream bricks during the movement of the carriage 1 to the left in FIG. 1, the rod 34 is returned to its initial position which, as far as the picking-up spoke 17 is concerned, is shown in FIG. 2.

For guiding the ice cream bricks 19 in the lateral direction on the web 7, there are provided two guide plates 36 and 37, which are the mirror images of one another, and which are adjustably secured between the side members 3 of the carriage 1. In the example shown they are secured to the shaft 24, see FIG. 3, and to the corresponding shaft 38, see FIG. 2, for the sprocket 22. The opposed side faces of the guide means 36 and 37 are parallel in the lower part of the guide means, see FIG. 3, whilst in the upper part of the guide means, see FIG. 2, they diverge and consequently form a funnel-like inlet to the lowermost portion of the path of the ice cream bricks where they are guided laterally by the guide means.

During the inward movement, illustrated in FIG. 1, of the carriage 1, the rollers 31 and the tongs 18 are successively actuated by the releasing means 32, 33 projecting from the carriage to successively release the ice cream bricks 19 suspended from a spoke 16. Subsequently to having been released from tongs 18, the ice cream brick 19 falls down onto the inclined section of the web 7 between the rollers 12 and 13 and hereby it is guided sideways into place with the help of the guide means 36 and 37. The web 7 moves forward at constant speed since it is driven from the wrapping apparatus, not shown. The chain 20 with the locating means 25 and 26 mounted thereon is simultaneously moved by means of drive members, not shown, in the same direction as the web 7 and substantially at the same speed as the web. The locating means 25 and 26 pairwise disposed on the chain hereby ensure that an ice cream brick 19 is properly placed in the longitudinal direction on the web 7, the locating means 25 preventing the ice cream brick from running ahead of the web, and the locating means 26 preventing the ice cream brick from lagging behind. From the inclined section of the web 7 the ice cream bricks, guided by the locating means 25 and 26 and by the guide means 36 and 37, slide onto the horizontal section of the web 7 where the locating means still ensure the proper placing of the ice cream bricks in the longitudinal direction of the web. The production of the wrappers by folding the web 7 about the ice cream bricks 19 may be initiated as soon as the ice cream bricks have entered the horizontal run of the web, and in the drawings this is illustrated by a channel-shaped folding member 39 associated with the wrapping machine and disposed adjacent the apparatus shown.

When the carriage 1 has reached its innermost position in which all ice cream bricks 19 have been released from the tongs 18 on the spoke 16, it is returned to its outermost position, to the right in FIG. 1, and this return movement takes preferably place at the same speed as the speed of advance of the web 7. Hereby the web of material will come to a standstill in relation to the carriage, and the movement of the chain 20 is then stopped during said return movement whereby also the ice cream brick or bricks disposed on the portion of the web 7 present in the carriage 1 will remain in the position which they had assumed prior to the reversal of the carriage. In relation to the wrapping machine, the web 7 and consequently also the ice cream bricks disposed thereon, still moves forward at constant speed, and the actual wrapping operation proceeds, therefore, still continuously.

During the return movement of the carriage 1, the picking-up apparatus is turned one step so that when the carriage 1 is in its outermost position and starts its inward movement, the spoke 15 assumes the position which the spoke 16 assumed during the previous inward movement of the carriage 1. The ice cream bricks disposed in the tongs 18 of the spoke 15 are now released one at a time and move on the web 7 through the carriage 1 to the wrapping machine in direct continuation of the ice cream bricks previously released.

In the case of ice cream bricks which are relatively sticky on their surface, for example, because they have been provided with a coating of chocolate or the like, it may be expedient to insert means for ensuring a positive ejection of the ice cream bricks from the tongs to the subjacent web of wrapping material. On the other hand, ice cream bricks having a relatively smooth and hard surface, for example the so-called frozen sherbet or lemonade confections, may be guided down onto the wrapping material by means of a chute attached to the carriage and, if desired, this chute may be twisted so that the described 90°-turning of the ice cream bricks, before they are deposited from the spokes of the picking-up apparatus, may be dispensed with. Moreover, the said turning is, of course, only necessary when the ice cream bricks are not already in the position desirable for the purpose of wrapping, when they are being picked up. The chain shown including the locating means could be replaced by other equivalent means, for example a rotary wheel. The control of the movements of the carriage and the locating means and the coordination of these movements with the stepwise rotation of the picking-up apparatus could be effected in any appropriate manner. One series of locating means could be adapted for engagement with the end of the carrying stick of the ice cream brick instead of the end face of the ice cream brick proper, and the locating means could be designed so as to simultaneously guide the ice cream bricks in the lateral direction. The securing of the locating means to the chain may be effected in a known manner and preferably so that the locating means are readily detachable when the apparatus is to be adjusted to handle ice cream bricks of a different size. In the case of such adjustment it is also of importance that the guide means for laterally guiding the ice cream bricks, for example the means 36 and 37 shown in the drawing, can be readily adjusted in the lateral direction.

The apparatus shown in FIG. 4 has, like the apparatus shown in FIGS. 1–3, a carriage 101 which generally consists of a U-shaped frame having a horizontal bottom plate 102 and two upwardly projecting side members 103. By means of wheels 104 the carriage is supported on rails 105 on a base not shown.

The base contains bearing means for a roll 106 of wrapping material, and a web 107 of wrapping material is fed from the roll 106 over a diagrammatically shown tensioning unit comprising rollers 108, over a roller 109 journalled in the base, in a horizontal run through the carriage 101, over a roller 110 journalled in the base and back through the carriage. In the carriage 101 the web 107 passes over a guide roller 111 in an upwardly inclined direction to another guide roller 112, from where the web continues forwardly in the horizontal direction to a wrapping machine, not shown.

The apparatus shown is used in conjunction with for example a rotary ice cream brick freezing machine comprising a picking-up apparatus with a plurality of spokes each of which is provided with a plurality of holding means or tongs corresponding to the number of freezing cells, in a radial row in the refrigerator mould. In FIG. 4 one of the spokes designated by 115 of the picking-up apparatus is shown, and the spoke is shown as having six tongs 118. In the position shown the spokes 115 is located above and parallel to the upper horizontal run of the web 107, and the carriage is in the position where three of the ice cream bricks 119 originally disposed in the tongs 118 of the spoke 115 have already been released from the tongs. Thus, the carriage 101 is on its way inwards, i.e. to the left in FIG. 4, towards the vertical axis of rotation of the picking-up apparatus.

An endless conveyor belt 120 passes over two rollers 121 and 122 journalled in the side members 103 of the carriage 101 in such manner that the belt 120 extends in a forwardly and downwardly inclined direction towards the upper horizontal run of the web 107 of wrapping material. To the conveyor belt 120 there are secured locating means 125, in the embodiment shown there, which project so far from the conveyor belt as to be capable, as shown, to engage the trailing end of the carrying stick of an ice cream brick 119 disposed on the conveyor belt.

Each tongs 118 is provided with a spring-loaded clip being capable of retaining a carrying stick for an ice cream brick and being releasable against the urge of the spring on an arm 128 projecting from the tongs 118 being turned. Via a rod 129 the arm 128 is connected with another pivotal arm 130 which carries a roller 131. To the carriage 101 there is secured an upwardly extending rod 132 which at its upper end is provided with an inclined plate 133 which is disposed so that when the carriage 101 moves from the right to the left in FIG. 4 the plate 133 will successively get into contact with the rollers 131 on each of the tongs 118 and thereby turn the arms 130 and 128 for releasing the spring-loaded clip so that the ice cream brick retained in the tongs 118 drops towards the carriage 101.

For guiding the ice cream bricks 119 when, subsequent to their having been released by the respective tongs 118, they drop towards the carriage 101, there are attached to said carriage a chute 134 comprising a forwardly extending inclined bottom 135, the lower edge of which is disposed some distance above the conveyor belt 120 to permit the locating means 125 to pass under the bottom of the chute during movement of the conveyor belt, and two side members 136 for ensuring the location of the ice cream bricks in the lateral direction. During the inward movement of the carriage 101, one of the rollers 121 and 122 is, in a manner not shown, caused to rotate at such a speed that the conveyor belt 120 is caused to move at a speed substantially the same as the speed of the web 107 of wrapping material relative to the carriage, and the locating means 125 hereby ensure that the ice cream bricks 119 are successively advanced to and deposited on the horizontal run of the web 107 extending from the roller 112, which roller is disposed in front of and below the lower roller 122 of the conveyor belt 120.

For the accurate positioning of the ice cream bricks 119 on the web 107, there is provided a further conveyor belt 137 which runs over two equisized rollers 138 and 139 journalled in the carriage 101. The axes of the rollers are disposed at same height above the run of the web 107 extending from the carriage 101, and the belt 137 is provided with locating means 140, the interspacing of which corresponds to the desired distance between the ice creams bricks 119. The conveyor belt 137 is, similarly to the conveyor belt 120, driven substantially syncronously with the relative movement between the web 107 and the carriage 101, so that under the influence of the locating means 140 the ice cream bricks 119 will be substantially stationary in relation to the web 107, and the locating means 140 serve first and foremost to compensate for minor irregularities in the placing of the ice cream bricks originating from the preceding movement of advance by the aid of the locating means 125 on the conveyor belt 120.

In front of the carriage 101 there is provided a stationary wrapping machine, in which the wrappers are produced by folding the web 107 about the ice cream bricks, and of this wrapping machine FIG. 4 shows a horizontal channel 141, the bottom of which supports the web 107 and the ice cream bricks 119 disposed thereon, and the sides of which may be designed for successively folding the web over the ice cream bricks. In conjunction with the wrapping machine there may, as shown in FIG. 1, be provided a further horizontally extending conveyor belt 142 comprising locating means 143. The conveyor belt 142 is driven syncronously with the constant speed of advance of the web 107.

When the carriage 101 has reached its innermost position in which all ice cream bricks 119 have been released from the tongs 118 on the spoke 115, it is returned to its outermost position to the right in FIG. 4, and this return movement may preferably take place at the same speed as the speed of advance of the web 107. Consequently the web will come to a stand-still in relation to the carriage, and the movements of the conveyor belts 120 and 137 are then stopped during the return movement of the carriage, whereby also the ice cream brick or bricks disposed on the portion of the web 107 present in the carriage 101 and the conveyor belt 120 will remain in the position which they had assumed prior to the reversal of the carriage. In relation to the wrapping machine, the web and consequently also the ice cream bricks disposed thereon, still move forward at constant speed, and, therefore, the actual wrapping operation is still effected continuously.

FIG. 5 shows parts of a modified embodiment of the apparatus where the reciprocating carriage, not shown, for transferring ice cream bricks 119 to the web 107 is provided with a chute 151, the bottom of which extends all the way downwardly and forwardly from the ice cream bricks suspended in the tongs of the picking-up apparatus to the horizontal section of the web 107. The uppermost portion of the bottom 152 of the chute 151 is inclined with substantially the same inclination as the bottom 135 of the chute 134 shown in FIG. 4, and the lower part of the chute is curved concavely upwardly so that when being transferred to the web 107, the ice cream bricks already approximate the horizontal position. Like the chute 134, the chute 151 comprises two side members which in FIG. 5 are designated by 153, for guiding the ice cream bricks 119 in the lateral direction.

For positioning the ice cream bricks 119 on the web 107 the embodiment shown in FIG. 5 employs a locating means consisting of a hub 154 with six spokes 155, which are secured to the hub 154 in angularly equispaced relation. The hub 154 is rotatable on an axis which is fixed with respect to the carriage, not shown, and consequently also with respect to the chute 151, said axis passing substantially through the centre of the lower curved portion of the bottom 152 of the chute 151, and during the inward movement of the carriage when the ice cream bricks 119 are successively released from the tongs, not shown, of the picking-up apparatus by the aid of the upwardly extending releasing means 132, the locating means rotates at such a speed that the peripheral speed of the locating spokes 155 corresponds substantially to the relative velocity between the web 107 and the carriage. Hereby the ice cream bricks 119, when being transferred to the web 107, will have substantially the same speed as said web and, consequently, the web 107 with the ice cream bricks 119 may immediately be advanced to the wrapping machine, not shown, which may be constructed as referred to above in connection with FIG. 4.

As was the case in the embodiment shown in FIG. 4, the carriage, not shown, in FIG. 5, can perform its return movement at a speed equal to the absolute speed of advance of the web 107, and in such case the locating means 154, 155 will dwell during the return movement.

FIG. 6 illustrates a further simplified embodiment, wherein the reciprocating carriage has been entirely omitted. For the transfer of the ice cream bricks 119 from the tongs of the picking-up apparatus to the web 107, FIG. 6 shows a stationary guiding device 161 consisting of two side members 162 and eight transfer chutes 163–170 secured between said side members, the apparatus shown being intended for use in conjunction with a picking-up apparatus having eight tongs on each spoke. From a guide roller 171 located behind the first chute 163, the web 107 is passed in a downwardly inclined direction over two guide rollers 172 located in front of the last chute 170 and further in a horizontal run to the wrapping machine, not shown, through a channel 141, confer FIG. 4.

By the aid of releasing means, not shown, which are actuated syncronously with the cyclic movement of the picking-up apparatus, the eight ice cream bricks 119 held in the tongs of the picking-up apparatus are released in two steps during the dwelling period of the picking-up apparatus, and in the situation shown in FIG. 6, the four ice cream bricks which were originally suspended above the chutes 163, 165, 167 and 169, have already been released and have slid down the chutes to meet the continuously advanced web 107. On the web 107 there are shown four other ice cream bricks which are the last four bricks that were released from the preceding spoke of the picking-up apparatus, and when the four ice cream bricks which in FIG. 6 are shown on the chutes 163, 165, 167 and 169, by the advance of the web have reached the position now assumed by said four other ice cream bricks, the last four ice cream bricks, which in FIG. 6 are shown suspended above the chutes 164, 166, 168 and 170, will be released. It will be seen that this stepwise release of every second ice cream brick from the picking-up apparatus makes it practically feasible to design the transfer chutes 163–170 with an appropriate inclination and length with regard to the fact that the spacing between ice cream bricks must be substantially greater when the bricks are disposed on the web 107 than when they are suspended from the picking-up apparatus. If the difference between said two spacings is smaller, or if the number of ice cream bricks contained in a radial row in the picking-up apparatus is smaller, it will be possible to design the chutes for the simultaneous release of all ice cream bricks in a row. However, it would also be possible to use a smaller number of transfer chutes, for example four, when the picking-up apparatus has eight ice cream bricks suspended in a row, and to place said chutes on a reciprocating carriage like the one shown in FIG. 4. In that case the carriage is displaced between two successive releases of ice cream bricks from the picking-up apparatus, a distance corresponding to the distance between the two successively released groups of ice cream bricks.

In the embodiment shown in FIG. 6 there are no locating means in conjunction with the transfer chutes, and such locating means should, therefore, at all events, be provided in conjunction with the horizontal run of the web 107 of wrapping material. FIG. 6 shows a conveyor belt 142 comprising locating means 143 disposed and shaped like the conveyor belt shown in FIG. 4 and having the same reference numeral. For further ensuring the interspacing of the ice cream bricks 119 on the web 107, when the latter is advanced to the wrapping machine, and for preventing a too rapid advance of the ice cream bricks, there may furthermore be provided a displaceable stop 173 which is timed with the cycle of the apparatus to pivot on a horizontal axis 174 from the stop position shown to a position in which it releases the ice cream brick 119 so as to permit the latter to advance together with the web 107 up to the wrapping machine, guided by the locating means 143 on the conveyor belt 142.

As with the apparatus previously described and shown in FIGS. 1–3, it may be expedient to provide means ensuring a positive ejection of the ice cream bricks from the tongs of the picking-up apparatus, so that a certain motion ahead has already been imparted to the ice cream bricks when they come down on to the conveyor belt or the chute, respectively, which transfers them to the web of wrapping material. This applies in particular to the embodiment shown in FIG. 6, where the ice cream bricks have to slide down the chutes 163–170 only due to their own weight. To such extent as is compatible with the characteristic features of the apparatus here concerned, other alterations and modifications of the apparatus, such as those referred to in the description of FIGS. 1–3, may also find application.

I claim:

1. Apparatus for wrapping ice cream bricks and similar bodies which are conveyed in suspended position and in rows to a wrapping station at which station said bodies are wrapped one by one, comprising a carriage which is arranged for performing a reciprocating movement beneath and substantially parallel to a holder having means for holding a row of moulded bodies, said carriage comprising means for advancing a web of wrapping material through the carriage with a forwardly and downwardly inclined section and a subsequent section which extends substantially horizontally in the direction of movement of the carriage towards a wrapping unit for wrapping the moulded bodies, and means for successively releasing the holding means responsive to the movement of the carriage in one direction, said releasing means being disposed and shaped so that subsequent to the associated holding means having been released, a moulded body will fall down onto the downwardly inclined section of the web of wrapping material.

2. Apparatus as claimed in claim 1, wherein the releasing means is constituted by an upwardly extending rod or arm secured to the carriage and having an actuation member for opening a resilient clip in the holding means for the moulded bodies.

3. Apparatus as claimed in claim 1, wherein the carriage comprises locating means adapted for being moved along the web at substantially the same speed as the web and for determining in cooperation with the web the location of the moulded bodies in the longitudinal direction of the web.

4. Apparatus as claimed in claim 3, wherein the carriage is adapted for performing its return movement at substantially the same speed as the speed of advance of the web, and that the locating means are adapted for assuming a dwelling stage during the return movement of the carriage.

5. Apparatus as claimed in claim 1, wherein the carriage comprises guide means for positioning the moulded bodies in the lateral direction of the web.

6. Apparatus as claimed in claim 5, wherein said guide means are adjustable in the lateral direction of the carriage.

7. Apparatus as claimed in claim 5, wherein the locating means consists of vanes secured in pairs to a chain having a run parallel to each of the two said sections of the web, and wherein the distance between the two vanes of each pair corresponds substantially to the length of a moulded body.

8. Apparatus as claimed in claim 7, wherein the vanes are detachably secured to the chain.

9. Apparatus for wrapping ice cream bricks and similar elongated moulded bodies, comprising a holder having means for individually holding a row of such bodies in suspended position, a carriage supported for reciprocating movement beneath and substantially parallel to said holder and means for reciprocating said carriage, means on said carriage for guiding a continuously advanced web of wrapping material in a predetermined path through said carriage from a supply towards a wrapping unit for individually wrapping said bodies, said path including a substantially horizontal portion extending parallel to and below said holder, means on said carriage for successively releasing the individual holding means of said holder responsive to the movement of said carriage in one direction, inclined guide means on said carriage for gradually changing the vertical orientation of said bodies when released into a horizontal orientation and transferring the bodies onto said horizontal web portion, and locating means on said carriage movable along at least part of said horizontal web portion for determining the location of said moulded bodies in the longitudinal direction of said web.

10. Apparatus as claimed in claim 9, wherein the locating means consists of vanes or similar means secured to a belt or a chain having a run parallel to the horizontal section of the web.

11. Apparatus as claimed in claim 9, wherein the releasing means is constituted by an upwardly extending rod or arm secured to the carriage and having an actuation member for opening a resilient clip in the holding means for the moulded bodies.

References Cited
UNITED STATES PATENTS

| | | | |
|---|---|---|---|
| 2,424,103 | 7/1947 | Lobley et al. | 53—180 X |
| 2,528,997 | 11/1950 | Blanchard | 53—200 X |
| 2,957,285 | 10/1960 | Molins | 53—28 X |
| 3,053,026 | 9/1962 | Chapin et al. | 53—180 X |
| 3,214,885 | 11/1965 | Gram | 53—200 X |

FOREIGN PATENTS

| | | |
|---|---|---|
| 489,526 | 1/1953 | Canada. |
| 29,188 | 7/1807 | Germany. |
| 362,354 | 10/1922 | Germany. |
| 851,100 | 10/1960 | Great Britain. |

TRAVIS S. McGEHEE, *Primary Examiner.*

FRANK E. BAILEY, *Examiner.*

L. S. BOUCHARD, N. ABRAMS, *Assistant Examiners.*